United States Patent [19]

Uenohara

[11] Patent Number: 5,513,735
[45] Date of Patent: May 7, 1996

[54] CLUTCH COVER ASSEMBLY HAVING A WEAR COMPENSATION DEVICE

[75] Inventor: Norihisa Uenohara, Ibaraki, Japan

[73] Assignee: Kabushiki Kaisha Daikin Seisakusho, Osaka, Japan

[21] Appl. No.: 393,777

[22] Filed: Feb. 24, 1995

[30] Foreign Application Priority Data

Feb. 25, 1994 [JP] Japan .................................. 6-028141

[51] Int. Cl.⁶ .................................................. F16D 13/75
[52] U.S. Cl. .................................... 192/111 A; 192/70.25
[58] Field of Search .......................... 192/111 A, 89.23, 192/89.24, 70.25

[56] References Cited

U.S. PATENT DOCUMENTS

| | | | |
|---|---|---|---|
| 2,678,120 | 5/1954 | Binder .................................. | 192/111 A |
| 4,339,023 | 7/1982 | Maycock .............................. | 192/111 A |
| 4,844,226 | 7/1989 | Taketani ............................... | 192/89.23 |
| 4,924,991 | 5/1990 | Takeuchi .............................. | 192/111 A |
| 5,018,613 | 5/1991 | Nagano ................................ | 192/111 A |
| 5,409,091 | 4/1995 | Reik et al. ........................... | 192/111 A |
| 5,450,934 | 9/1995 | Maucher .............................. | 192/111 A |

*Primary Examiner*—Andrea L. Pitts
*Attorney, Agent, or Firm*—Shinjyu Office of Patent Attorney

[57] ABSTRACT

A clutch cover assembly having a clutch cover 10, a pressure plate 11, a support mechanism 12, a diaphragm spring 13, a plurality of wear compensation mechanisms 14, and a ring plate 27 which operates as a coincidence control device. The support mechanism 12 is disposed on the opposite side of the pressing surface to move freely of the pressure plate 11. The diaphragm spring 13 pushes the pressure plate 11 toward the flywheel 2 via the support mechanism .12. The plurality of wear compensation mechanisms 14 are disposed at several places around the pressure plate 11, each being a mechanism for moving the support member 12 a distance toward the diaphragm spring 13 compensating for the amount of wear on friction facings 6. The ring plate 27 is a mechanism for simultaneously moving the various wear compensation 14 mechanisms.

12 Claims, 7 Drawing Sheets

CLUTCH COVER ASSEMBLY HAVING A WEAR COMPENSATION DEVICE

BACKGROUND OF THE INVENTION

The invention relates to a clutch cover assembly, particularly to a clutch cover assembly having a pressure plate, a diaphragm spring and a compensating mechanism disposed therein for maintaining a generally uniform bias position of the diaphragm spring with respect to the pressure plate irrespective of the wear on a clutch disc.

Description of the Related Art

A clutch cover assembly is typically fixed to a flywheel of an engine and includes a pressure plate which urges a clutch disc against the flywheel in order to selectively transmit engine power to a transmission connected to the clutch. It is very desirable to extend the life of the clutch cover and a clutch disc. One method of extending the life of the clutch disc, for example, is to the attach facings to a clutch plate without using rivets, thus increasing the effective thickness of the facings.

One example of conventional technology, Japanese Patent Laid-Open Document No. 27092/1989, provides for a clutch cover assembly in which the initial load of the diaphragm spring automatically returns to an initial set orientation, having an initial bias, when disc wear occurs. In the conventional assembly, an inner and outer fulcrum ring and a plurality of wear compensation mechanisms are disposed between the diaphragm spring and the pressure plate. The wear compensation mechanisms are disposed around the circumference of a pressure plate in a plurality positions and work to displace the fulcrum ring toward the diaphragm spring in response to wear on the facings. Each mechanism includes slide elements and coil springs. The slide elements are movable in a radially outward direction and are disposed in an annular groove formed in the pressure plate, and the springs urge the slide element radially outward. Forming a wedge-like pattern, the fulcrum rings and the slide elements are disposed such that angled surfaces of the fulcrum rings touch the respective angled surfaces of the slide elements. After the friction facings have worn, when the release mechanism releases the pressure of the diaphragm spring, the slide elements push the fulcrum springs radially outward toward a contact portion of the diaphragm spring. Accordingly, the diaphragm spring maintains an initial flexed orientation along with an initial bias load.

In this conventional device, where a plurality of wear compensation mechanisms are disposed radially about the circumference within a clutch cover assembly, there are times, for example when one or more of the plurality of slide elements catch or lock up and the various compensation mechanisms do not operate synchronously. Then, the various portions of the diaphragm spring can not be uniformly supported. This causes the diaphragm spring to tilt, resulting in defective operation of the clutch.

SUMMARY OF THE INVENTION

One object of the present invention is to make uniform the operation of the plurality of wear compensation mechanisms.

Another object of the present invention is to accomplish the above object, of making uniform the operation of the plurality of wear compensation mechanisms, by employing a simply designed apparatus.

Still another object of the present invention is to moderate shock during clutch engagement by employing a simply designed apparatus.

In one aspect of the present invention, a clutch cover assembly includes a dish shaped clutch cover attachable to a flywheel of an internal combustion engine. A disk shaped pressure plate is disposed within and is attached to the clutch cover for rotation therewith and for limited axial displacement with respect to the clutch cover. The pressure plate is further formed with a friction surface engageable with a clutch disk disposed between the pressure plate and the flywheel. The pressure plate is further formed with an annular stepped portion formed opposite from the friction surface. A spring member is disposed in the clutch cover between the pressure plate and the clutch cover biased to urge the pressure plate into engagement with the clutch disk.

A clutch disk wear compensation device is at least partially disposed in the annular stepped portion between the pressure plate and the spring member. The wear compensation device includes a plurality of wedge members spring biased into engagement with one another and a ring plate disposed in the annular stepped portion configured to synchronize generally uniform movement of the wedge members in response to clutch disk wear.

In a further aspect of the invention, the clutch disk wear compensation device further includes an annular ring shaped base cover member disposed between the spring member and the ring plate member. The base cover member and the ring plate member retain the plurality of wedge members therebetween. The base cover member is fixed to the pressure plate for rotation therewith and for limited axial displacement therewith in response to movement of the wedge members.

The ring plate rotates with respect to the pressure plate in response to clutch disk wear. The plurality of wedge members include a first set of wedge members in contact with the ring plate and are configured for rotation with the ring plate. A second set of wedge members is in stationary contact with the base cover.

At least one movement restriction member is retained in a portion of the pressure plate, contactable with the flywheel and extending through an aperture formed in the base cover and restricting axial movement of the base cover in response to clutch disk wear.

The ring plate is formed with at least one protrusion, and the wear compensation device further comprises a coil spring coupled to the protrusion which contacts at least one wedge member, urging the ring plate to rotate within the annular stepped portion.

In yet another aspect of the invention, the wear compensation device includes a pin extending through a hole formed in the ring plate protrusion, the coil spring being disposed about the pin.

In another aspect of the present invention, a clutch cover assembly is connected to the engine flywheel, for engaging and disengaging friction facings to and from an input rotation member of a transmission. The assembly includes a dish-shaped clutch cover, a pressure plate, a support mechanism, a diaphragm spring, a plurality of wear compensation mechanisms, and a coincident control device. The assembly in general has a center line axis C–L.

The dish-shaped clutch cover is fixed to the input rotation member. The pressure plate has a first axial surface and a second axial surface. The first axial surface is a pressing surface and the second axial surface has an annular stepped portion in which the support mechanism is disposed. The support mechanism rotates with the pressure plate, but is axially displaceable. The diaphragm spring presses the pressure plate toward the input rotation member via the support mechanism, and is set at a pre-stressed orientation having an initial bias for urging the pressure plate in clutch engagement. The plurality of wear compensation mechanisms connect the support member to the pressure plate, and displace the support member a distance toward the diaphragm spring adjustively compensating for the amount of wear on the friction facings. The coincidence control device is for synchronous controlling displacement of the various wear compensation mechanisms.

It is preferable for each wear compensation mechanisms to include a transfer member and an urging member. The transfer member contacts a portion of the support mechanism and is disposed to move freely around the axis C–L within the stepped portion of the pressure plate, and is for displacing the support mechanism. The urging member displaces the transfer member by urging it in a direction of transfer, i.e. toward the diaphragm spring. It is further preferable the coincidence control device be a connective member.

It is desirable also for the transfer members to be disposed in a circle-like state, and the connecting member of coincidence control device to be a ring-shaped plate member fixed to the transfer member of each wear compensation mechanism.

In an alternate embodiment, it is desirable the ring-shaped plate member be made up of a plurality of separate pieces.

It is moreover preferable that the ring-shaped plate member have a plurality of holding portions formed extending about the axis C–L, and that the urging member be a spring held by the holding portions, for urging the transfer member in a transfer direction.

It is further preferable if the support mechanism have a disc shaped metal plate member disposed to cover the outer perimeter of the pressure plate, a plurality of cam members fixed to the pressure plate side of the metal plate member, and a disc shaped support member disposed on the diaphragm spring side of the metal plate member and having axially extending portions for supporting the diaphragm spring.

Lastly, it is desirable the disc shaped support member be a spring.

The forgoing and other objects, aspects and advantages of the present invention will become more apparent form the following detailed description, when taken in conjunction with the accompanying drawings.

DETAILED DESCRIPTION OF THE PREFERRED EMBODIMENTS

Figure 1:
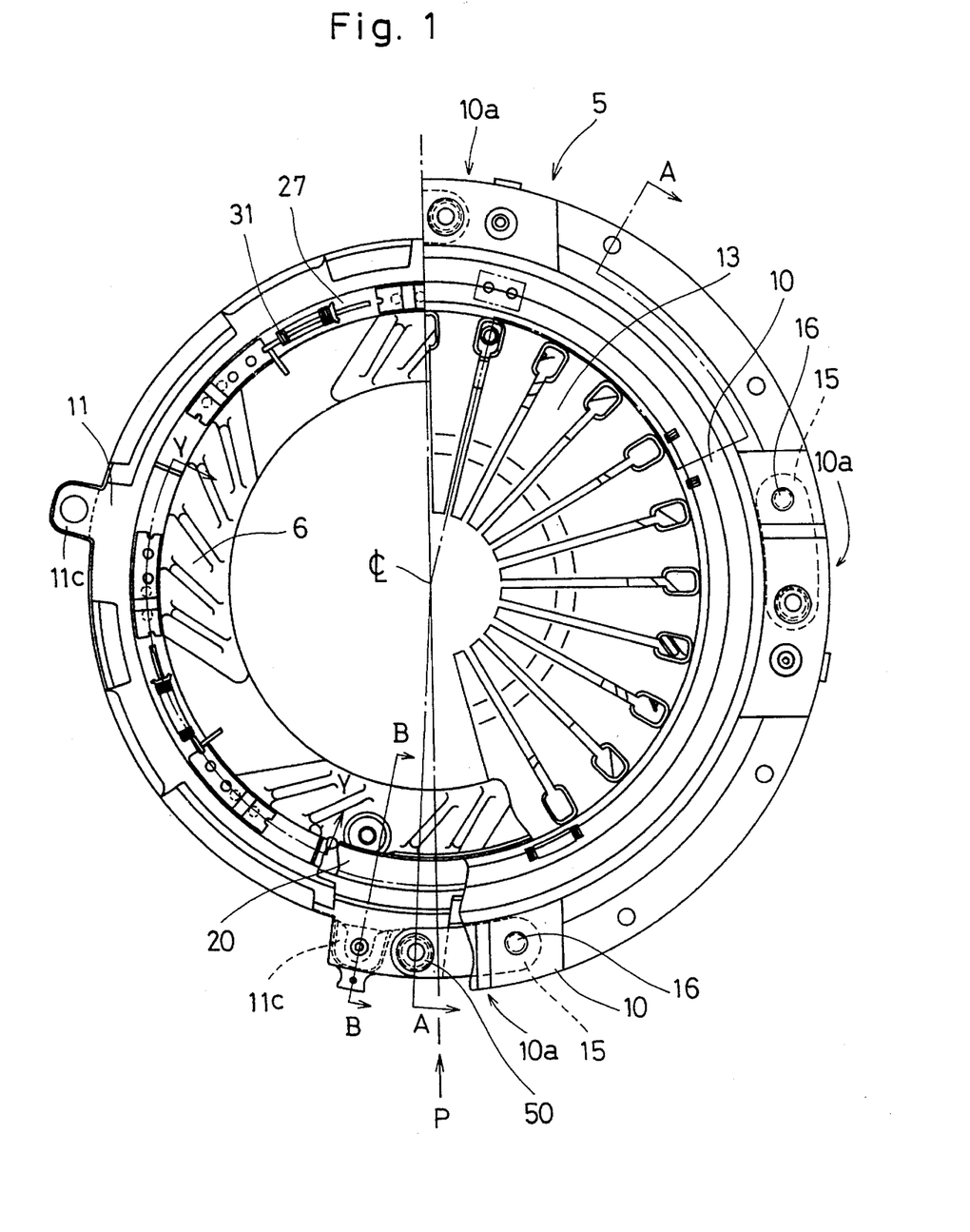
FIG. 1 is a fragmentary elevation of a clutch cover assembly in accordance with one embodiment of the present invention.
Figure 2:
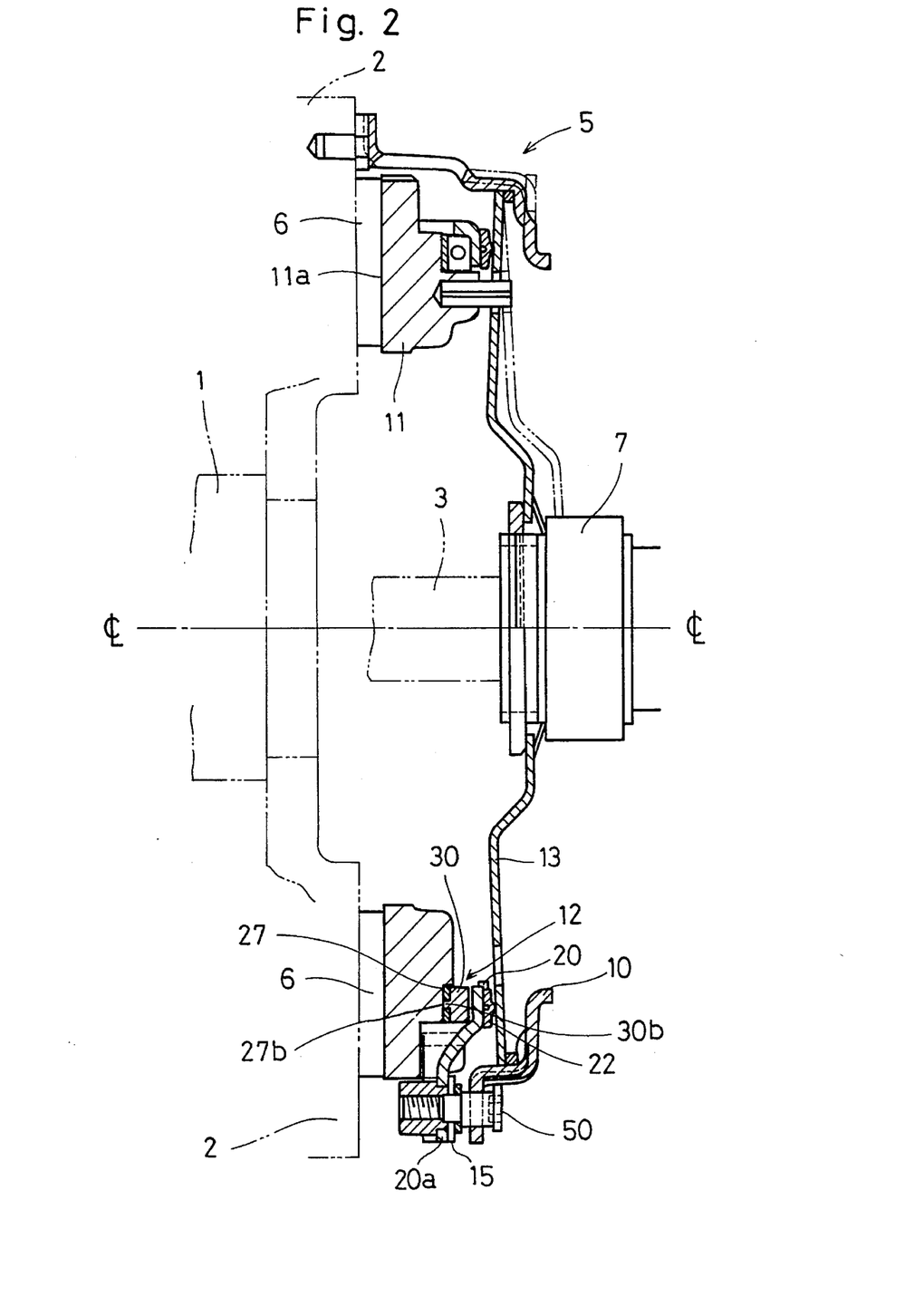
FIG. 2 is a fragmentary, part-section, part side elevation of the clutch cover assembly depicted in FIG. 1, taken alone the line A—A.

One embodiment of the present invention is shown employed in the apparatus shown in. FIGS. 1–6. As is shown in FIG. 2, a clutch cover assembly 5 is bolted to a flywheel 2, which is connected to a crankshaft 1 of an engine not shown. A transmission shaft 3 extends toward the crankshaft 4. A engine (not shown) is disposed to the left side of the figure, and a transmission (not shown) is to the right.

Figure 3:
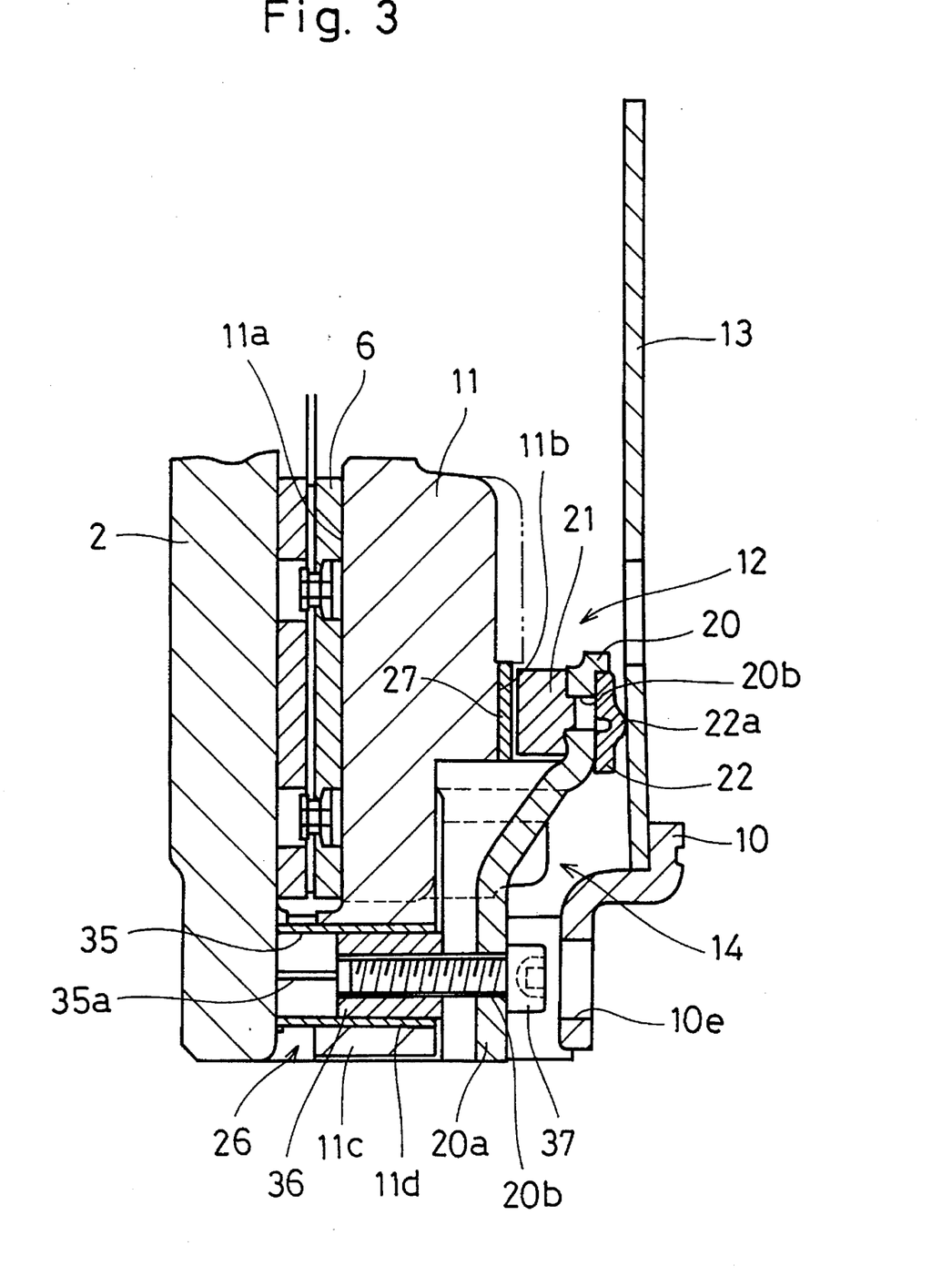
FIG. 3 is a fragmentary-section of a portion of the assembly depicted in FIG. 1, taken along the line B—B on an enlarged scale.

Referring to FIGS. 2 and 3, the clutch assembly 5 further includes friction facings 6 which are a part of a clutch disc not completely shown. The center of the clutch disc, attached to the friction facings 6 are spline connected to the main drive shaft 3 in a manner not shown, but is well known in the art. The release mechanism 7 is disposed around the main drive shaft 3 and is moveable in an axial direction along the line C–L.

A portion of the clutch cover assembly 5 of the present invention is shown in FIG. 3. The clutch cover assembly 5, includes a clutch cover 10, a pressure plate 11, a support mechanism 12 disposed on the clutch cover 10 side of the pressure plate 11, and a diaphragm spring 13 for urging the pressure plate 11 toward the flywheel 2 via the support mechanism 12. Furthermore, the clutch cover assembly 5 contains a wear compensation mechanism 14.

Figure 4:
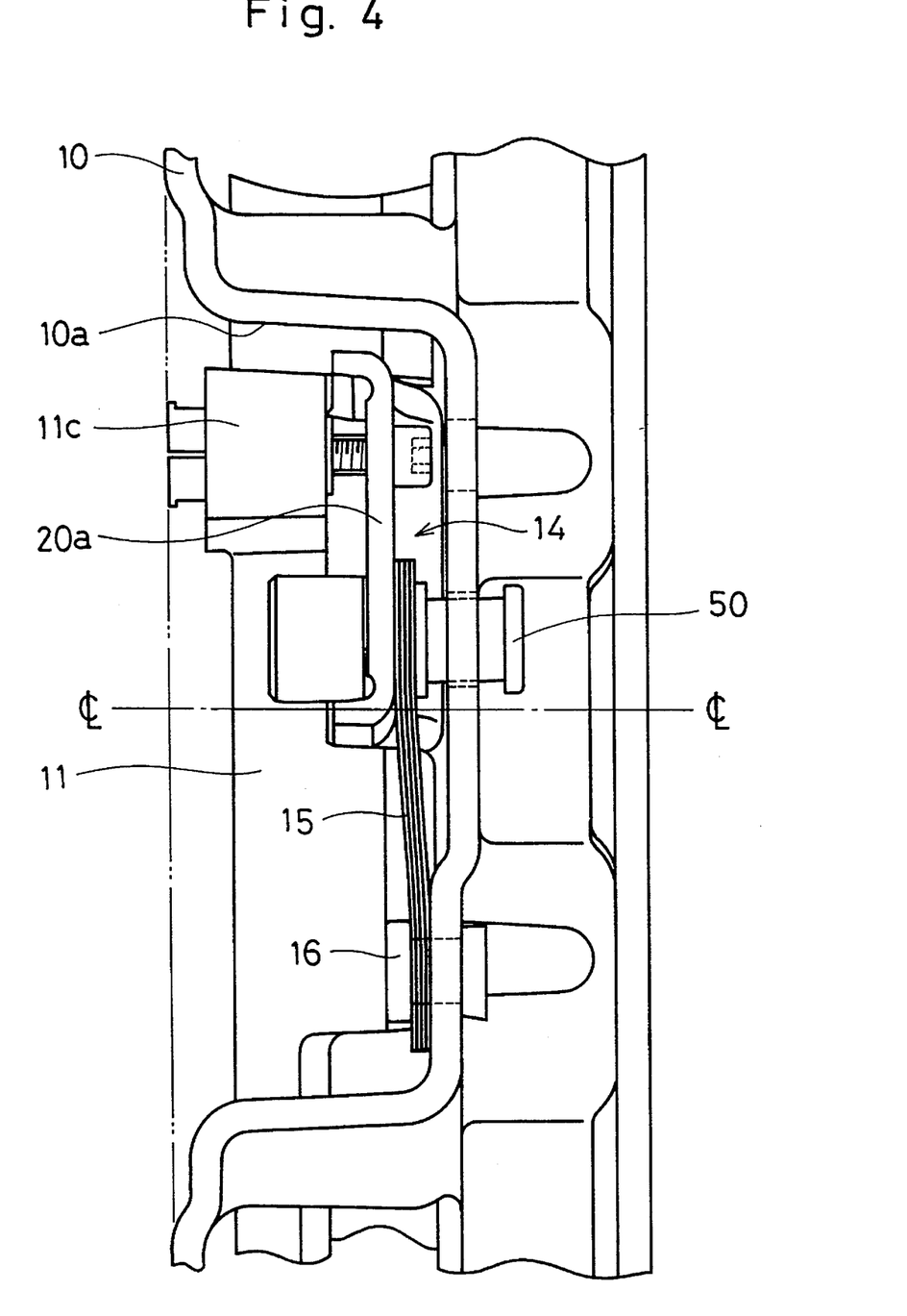
FIG. 4 is a fragmentary side elevation of a portion of a clutch cover of the assembly depicted in FIG. 1 looking in the direction of the arrow P in FIG. 1.

The clutch cover 10 is generally a dish shaped member rigidly attached to the perimeter of the flywheel 2, as shown in FIG. 2. As is shown in FIGS. 1 and 4, openings 10a are formed in the radially external wall at predetermined distances around the circumference of the clutch cover 10. Disposed to align with each of the openings 10a, are strap plates 15 which are made up of a plurality of metal bands and extend in a direction perpendicular to a radius from axis C–L. One end of the strap plates 15 are rigidly attached to the clutch cover 10 via bolts 16, and the other end of the strap plates 15 are rigidly attached to flanges 20a via pins 50 (see FIGS. 2 and 4). The flanges 20a will be described in greater detail below. The strap plates 15, while rotating together with both the pressure plate 11 and the clutch cover 10, allow for pull-releasing the pressure plate 11 from the friction facings 6 when the bias of the diaphragm spring 13 is released from the clutch cover 10. In other words, the strap plates cause the pressure plate 11 and the clutch cover 10 to rotate as a single unit, but the strap plates 15 flex to allow the pressure plate 11 to be displaced axially along the line C–L in response to the release mechanism 7 moving the diaphragm spring 13 with respect to the flywheel 6.

The pressure plate 11 is generally a disc shaped member disposed within the clutch cover 10. The pressure plate 11 has a first axial surface, a pressing face 11a, for engaging the friction facings 6 against the flywheel 2. On a second axial surface of the pressure plate 11, at the perimeter, is formed an annular stepped portion 11b (FIG. 3). A plurality of coupling portions 11c are formed at spaced apart intervals on a radially outer portion of the pressure plate 11. The coupling portions 11c protrude radially out from the pressure plate 11 and are aligned to face the openings 10a of the clutch cover 10. A plurality of holes 11d are formed piercing the coupling portions 11c.

The support mechanism 12 includes a base cover 20 (see FIGS. 2, 3, 4 and 5), a plurality of cams 21 (See FIG. 5) rigidly attached to the base cover 20, and a support plate 22 (See FIGS. 2 and 3) disposed between the base cover 20 and the diaphragm spring 13.

Figure 5:
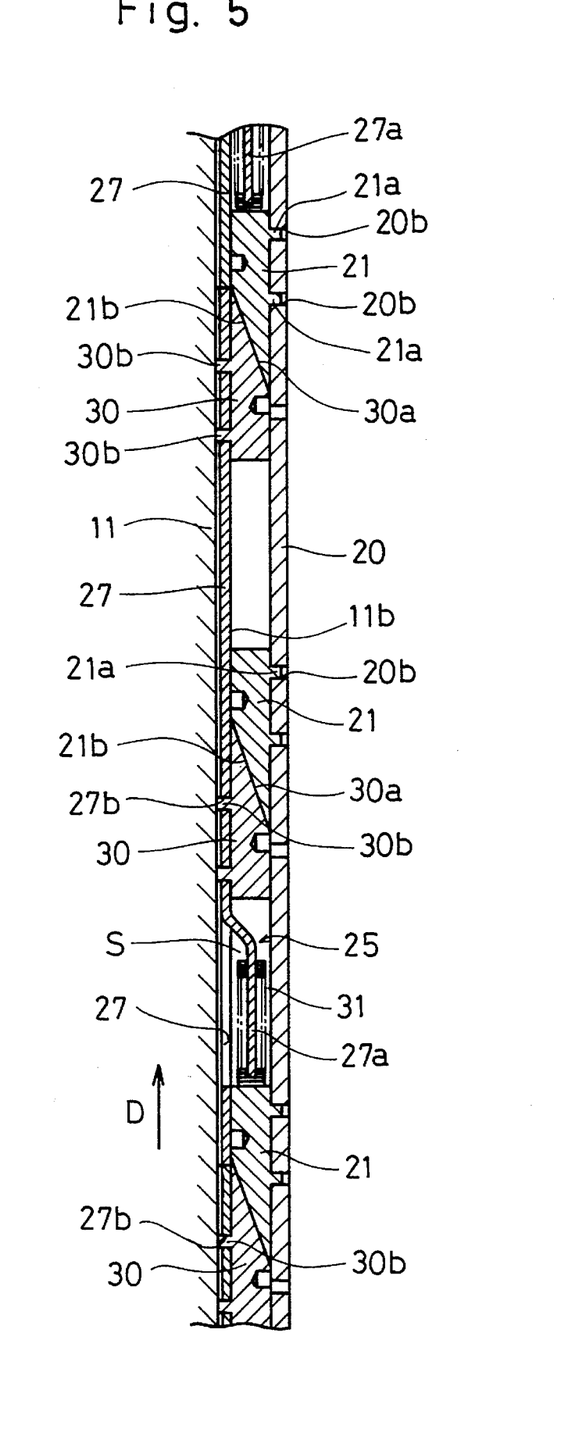
FIG. 5 is an enlarged arcuate cross section of a support mechanism and a wear compensation mechanism employed in the assembly depicted in FIG. 1 taken along line Y—Y.

The base cover 20 is generally ring-shaped and is disposed to cover the outer perimeter of the pressure plate 11. The base cover 20 has a plurality of flanges 20a extending radially outward, and has a plurality of holes 20b on a radially inner portion. The holes 20b are formed at spaced about intervals about the base cover 20 circumference. The flange 20a supports a portion of the wear compensation mechanisms 14, as will be explained below.

As shown in FIG. 5, a plurality of cams 21 are disposed in the stepped portion 11b of the pressure plate 11. Each cam 21 is formed with teeth portions 21a extending toward the base cover 20 to fit into the holes 20b of the base cover 20. The cams 21 have a sloped surface 21b on the surface facing the pressure plate 11.

Figure 7:
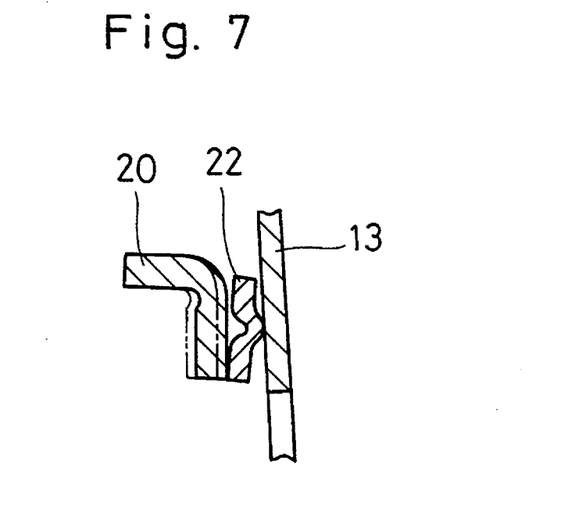
FIG. 7 is a fragmentary section of a portion of the clutch cover in accordance with an alternate embodiment of the present invention, where the clutch is in the released state.

The support plate 22, shown in FIGS. 2, 3, 4, and 5, is a disc-shaped metal plate member having a support portion 22a protruding toward the diaphragm spring 13 for contact therewith. The support plate 22, as is shown in FIG. 7, may alternatively be a disc spring.

A wear compensation mechanism 14 disposed in the clutch cover 5. The wear compensation mechanism 14 includes an urging mechanism 25 (FIG. 5) and a restriction mechanism 26 (FIG. 3).

Figure 6:
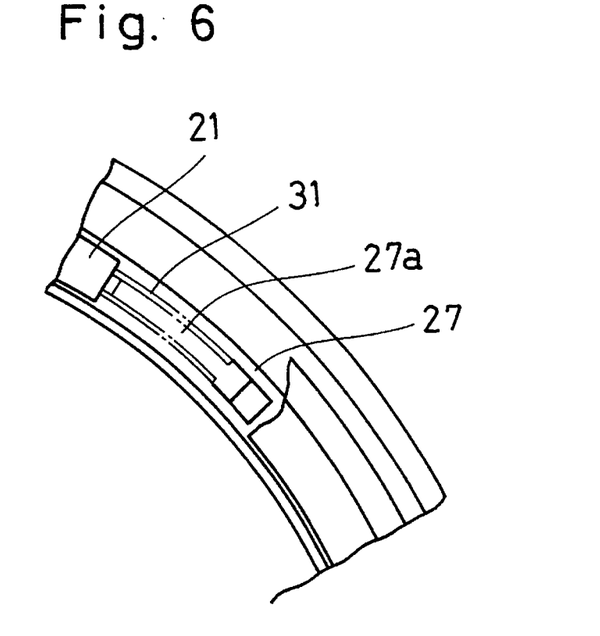
FIG. 6 is a fragmentary section of the wear compensation mechanism depicted in FIG. 5.

The urging mechanisms 25 are explained in detail below with respect to FIGS. 5 and 6. Each urging mechanism 25 includes a tapered block 30 disposed facing one of a corresponding cam member 21, so that corresponding cam faces 21b and 30a are in contact. A spring 31 is disposed in an annular space between one adjacent cam 21 and the tapered block 30. Disposed between the pressure plate 11 and the tapered blocks 30 is ring plate. 27 formed with holes 27b, as shown in FIGS. 2 and 5. The first axial surface of the tapered blocks 30 facing the pressure plate 11 have teeth portions 30b formed thereon for coupling with the holes 27b of the ring plate 27; and the second axial surface, the tapered surface 30a, is for aligned contact with the respective surfaces 21b of the cams 21 of the support mechanism 12. The ring plate 27 is disposed within the annular stepped portion 11b of the pressure plate 11. A plurality of protruding portions 27a are formed at spaced apart intervals about the circumference of the ring plate 27 to provide toward the base cover 20, positioned between the tapered blocks 30 of the urging mechanism 25 and the cams 21 of the support mechanism 12. Coil springs 31 are disposed within a spaces adjacent to protruding portions 27a. The springs 31 engages the adjacent cam 21 and a slot (not shown) on the protruding portion 27a to urge the ring plate 27 in the direction D in FIG. 5. Accordingly, the tapered block 30 is urged about the axis C–L toward the cams 21 due to bias of the spring 31 contacting the ring plate 27. That is, the cams 21 are in constant receipt of an outward moving force urging the cams 21 away from the flywheel 11. Furthermore, since the spring 31 is held in the slot of the protruding portion 27a, the spring 31 does not directly touch the pressure plate 11, thereby thermal influence is suppressed and deformation is reduced.

The restriction mechanisms 26 are fastened to the coupling portions 11c of the pressure plate 11. Each restriction mechanism 26 is generally made up of a wedge collar 35, a wedge 36 and a bolt 37 (FIG. 3).

The wedge collar 35 of each restriction mechanism 26 is a cylindrical, hollow member; and is inserted to slide freely within the hole 11d. Axially orientated slits 35a are formed in the wedge collar 35 such that the collar 35 is radially expandable and contractible. The wedge collars 35 have an internal generally cone-like tapered bore, the radius of which decreases in a direction toward the clutch cover 10. When friction facings 6 are engaged between the pressure plate 11 and the flywheel 2 during clutch engagement, first ends of the wedge collars 35 contact the face of the flywheel 2. Wedges 36 further have an external tapered radius, the radial surface of which fit complementary into the center of the internal tapered bore of the wedge collars 35. The wedges 36 further have formed within the center a bolt hole. The bolts 37 are screwed into the bolt holes. The bolt 37 protrudes through the holes formed in the flange 20a of the base cover 20, and the heads of the bolts are seated on the clutch cover side of the flange 24a. Due to the flange 24a having the bolt heads set thereon, the axial movement of the support mechanism 12 is restricted.

Holes 10e are further formed in the clutch cover 10 in alignment over the heads of the bolts, respectively.

Next, operation of the above described clutch cover assembly is explained below.

When clutch engagement begins, the diaphragm spring 13 presses the pressure plate 11 toward the flywheel 2 via the support mechanism 12, and accordingly the friction facings 6 are engaged between the pressure plate 11 and the flywheel 2.

When the clutch is released, there is no engagement between the diaphragm spring 13 and the support mechanism 12, since the releasing mechanism 7 pulls the diaphragm spring 13 toward the right side of the drawing in FIG. 2. When the clutch is disengaged, the pulling load of the strap plates 15, in the direction of the diaphragm spring 13, acts on the heads of the bolts 37 via the flange 20a of the base cover 20 which in turn acts on the respective wedge collars 35 via the wedges 36. Here, when the wedges 86 are pulled toward the diaphragm spring 18, because of contact between the surfaces of the wedges 36 and the wedge collars 85, the wedge collars 35 expand outward against the sides of holes of the coupling portion 11c. Accordingly, the wedge collar 35 remains fixed with respect to the flywheel 2. The pressure plate 11 is thus separated from the friction facings 6 and the release operation is complete.

During the operation of the assembly in the situation wear occurs on the friction facings 6 during clutch engagement and disengagement. When wear occurs, the support mechanism 12 and the pressure plate 11 move toward the flywheel 2 due to the bias load of the diaphragm spring 13. The end of the wedge collars 35 contact the flywheel 2 such that, the wedge collars 35, the wedges 36 and the bolts 37 do not move with respect to the flywheel 2 but do move with respect to the pressure plate 11. Resultantly, a gap equivalent to the amount of the friction facings 6 wear develops between the head of the bolts 37 and the flange 20 a of the base plate 20 due to the movement of the wedge collars, wedges 36 and the bolts 37 with respect to the pressure plate 11.

Accordingly, during the release operation, engagement between the diaphragm spring 13 and the base cover 20 is released and slack due to the above mentioned gap allows the bias of the springs 31 to displace the tapered blocks 30, thereby forcing the cams 21 toward the diaphragm spring 13.

Thus, due to the urging mechanism 25, the cams 21 of the support mechanism 12 am displaced to take up the above mentioned slack, and the base cover 20 and the pressure plate 11 are displaced toward the diaphragm spring 13 until the flange 20a of the base cover 20 is returned to a position where it contacts the bolts 37. Once contact is made, movement of the base cover 20 is stopped. The bolt 37 is unmoving with respect to the flywheel 2 due to the restraining function of the restriction mechanism 26 as the friction forces between the wedge collars 35 and their respective holes in the coupling portion 11c of the pressure plate 11 is greater than the combined bias of the release mechanism 7 and the strap plates 15.

In accordance with the above defined operation, the support mechanism 12, which includes the base cover 20, moves toward the diaphragm spring 13 a distance proportional with the amount the friction facings 6 were worn, and is then stopped. Here, the axial height at which the support mechanism 12 (and thereby the support plate 21) is returned to the original set height, because the flange 20a of the base cover 20 contacts the bolt heads 37 of the restriction member 26. Subsequently, in subsequent clutching operations of the assembly, even when the friction facings 6 wear, the bias posture of the diaphragm spring 13 is unchanged and maintains the original set load.

As the support mechanism 12 of this type has a base cover 20 of plate metal construction, the assembly process is made easy and lighter than conventional devices. Furthermore, use of a fixing pin is made unnecessary, since support of the diaphragm spring 13 is carried out by the support plate 22 as opposed to the base cover 20, and coupling is accomplished by aligning the holed section 20b of the base cover 20 with the teeth portions 21a of the cams 21.

Here, in the above described wear compensation operation, since them is no slack or spacing between the ring plate 27, the tapered blocks 30 riding on the ring plate 27 are moved coincidentally about the axis C-L. That is, the plurality of cams 21 are displaced coincidentally toward the diaphragm spring 13 the same distance. Therefore, the base cover 20 and the support plate 22 do not tilt but are kept at uniform height. Accordingly, height variation of the lever portion of the diaphragm spring 13 is checked reducing defective clutch engagement.

Variations (a) The above embodiment, though providing base cover 20 and support plate 22 of the support mechanism 12 as separate elements, these elements may alternatively be formed as a single element as well.

(b) The above embodiment, though disclosed as being for a clutch of the pull type, may be modified for a push type clutch as well.

Figure 8:
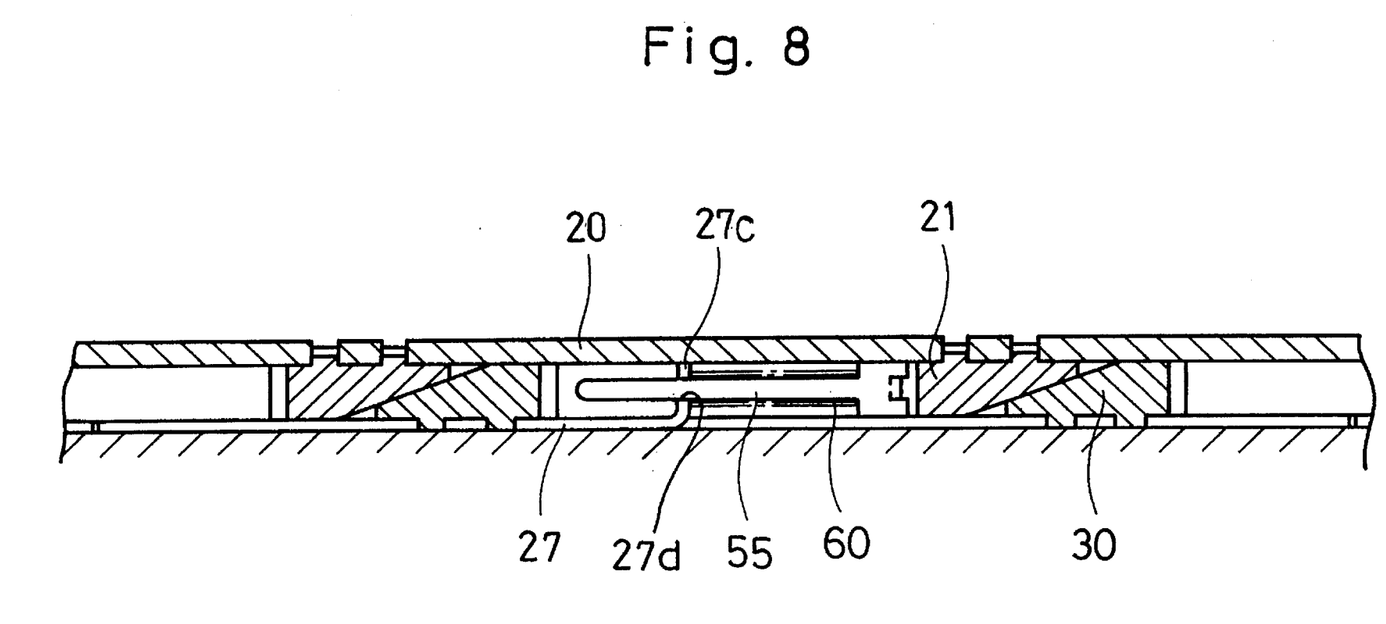
FIG. 8 is a fragmentary section similar to FIG. 5 showing another alternate embodiment of the present invention.

In an alternate embodiment, shown in FIG. 8, the ring plate 27 is formed with bent tab portions 27c. Holes 27d are formed in the tab portions 27c. A pin 55 extends loosely through each hole 27d. A spring 60 is disposed about the pin 55, and between the tab portion 27c and the adjacent cam member 21. Thus, the spring urges the head of the pin 55 into engagement with the cam 21 and urges the ring plate 27 to rotate about the line C-L.

It should be understood that in either embodiment, the ring plate 27 may be formed from a single material, for instance sheet metal, deformed to form either the protruding portion 27a in FIG. 5 or the tab portion 27c in FIG. 8.

Height fluctuation in the support of the pressing member is suppressed in a clutch cover assembly of the present invention, as above described, and tilt of the pressing member is reduced because of the simultaneous movement of the multiple wear compensation mechanisms by the coincidence control device.

A clutch cover assembly of simple structure for the coincident control of a plurality of wear compensation mechanisms can be had in the situation where each of the wear compensation mechanisms is made up of a member movable about the circumference of the axis C-L and an urging mechanism urging the members to move radially.

A clutch cover assembly having an inexpensive and simple structure for the coincident control of a plurality of wear compensation mechanisms can be had in the situation where transfer members are arranged about the axis C-L, and where a connection member is a ring shaped plate member having connected thereto the transfer member of the wear compensation mechanisms.

The structure is made simple and the cost of production is less where the ring shaped plate is a plurality of separate pieces.

In the situation where a cut out portion is formed in the ring shaped plate and a spring is inserted in the cut out portion, the spring can easily be positioned remote from the pressure plate and can thereby suppress deterioration of the spring characteristics.

The clutch cover assembly can be made simple and light in the situation where the support mechanism supporting the pressing member is made up of a disc shaped metal plate member disposed to cover the radial external portion-perimeter of the pressure plate, a plurality of cam members rigidly attached to the pressure plate side of the metal plate member, and a disc shaped support member having a protruding portion.

In the case when the disc shaped plate of the support mechanism is a plate spring, even should the friction member not have a cushion plate, shock during engagement is moderated.

Various details of the invention may be changed without departing from its spirit nor its scope. The foregoing description of the embodiments according to the present invention is provided for the purpose of illustration only, and not for limiting the invention as defined by the appended claims and their equivalents.

What is claimed:

1. A clutch cover assembly comprising:

a dish shaped clutch cover attached to a flywheel;

a disk shaped pressure plate disposed within and attached to said clutch cover for rotation therewith and for limited axial displacement with respect to said clutch cover, formed with a friction surface engageable with a clutch disk disposed between said pressure plate and the flywheel, and an annular stepped portion formed opposite from said friction surface;

a spring member disposed in said clutch cover between said pressure plate and said clutch cover biased to urge said pressure plate into engagement with the clutch disk;

a clutch disk wear compensation device at least partially disposed in said annular stepped portion between said pressure plate and said spring member, said wear compensation device including a plurality, of wedge members spring biased into engagement with one another and a ring plate disposed in said annular stepped portion configured to synchronize generally uniform movement of said wedge members in response to clutch disk wear;

wherein said ring plate rotates with respect to said pressure plate in response to clutch disk wear and said plurality of wedge members includes a first set of wedge members in contact with said ring plate configured for rotation with said ring plate and a second set of wedge members in stationary contact with said base cover.

2. A clutch cover assembly as in claim 1, further comprising at least one movement restriction member retained in a portion of said pressure plate, in contact with the flywheel and extending through an aperture formed in said base cover and restricting axial movement of said base cover in response to clutch disk wear.

3. A clutch cover assembly as in claim 1, wherein said clutch disk wear compensation device further includes an annular ring shaped base cover member disposed between said spring member and said ring plate member, said base cover member and said ring plate retaining said plurality of wedge members therebetween, said base cover member fixed to said pressure plate for rotation therewith and for limited axial displacement therewith in response to movement of said wedge members.

4. A clutch cover assembly as in claim 3, further comprising a support plate disposed between said base cover and said spring member.

5. A clutch cover assembly as in claim 4, wherein said support plate is biased to urge said base cover away from said spring member.

6. A clutch cover assembly, comprising:

a dish shaped clutch cover attached to a flywheel;

a disk shaped pressure plate disposed within and attached to said clutch cover for rotation therewith and for limited axial displacement with respect to said clutch cover, formed with a friction surface engageable with a clutch disk disposed between said pressure plate and the flywheel, and an annular stepped portion formed opposite from said friction surface;

a spring member disposed in said clutch cover between said pressure plate and said clutch cover biased to urge said pressure plate into engagement with the clutch disk;

a clutch disk wear compensation device at least partially disposed in said annular stepped portion between said pressure plate and said spring member, said wear compensation device including a plurality, of wedge members spring biased into engagement with one another and a ring plate disposed in said annular stepped portion configured to synchronize generally uniform movement of said wedge members in response to clutch disk wear;

wherein said ring plate is formed with at least one protrusion, and said wear compensation device further comprises a coil spring coupled to said protrusion which contacts at least one wedge member urging said ring plate to rotate within said annular stepped portion.

7. A clutch cover assembly as in claim 6 wherein said wear compensation device further comprises a pin extending through a hole formed in said ring plate protrusion, said coil spring being disposed about said pin.

8. A clutch cover assembly coupled to an output rotation member, for engaging and disengaging a friction member to and from an input rotation member, comprising:

a dish shaped clutch cover fixed externally about the input rotation member;

a disc shaped pressure plate disposed within said clutch cover having a pressing surface in contact with one side of a friction member;

a support mechanism disposed opposite the pressing surface side of said pressure plate being non-rotatable with respect to said pressure plate and movable in an axial direction;

a diaphragm spring urging said pressure plate toward the input rotation member via said support member;

a plurality, of wear compensation mechanisms, disposed at various areas on said pressure plate, move said support mechanism away from said pressure plate and toward the diaphragm spring in response to the amount of wear on said friction member;

a coincidence control device for simultaneously moving each one of said wear compensation devices;

wherein said compensation devices contact a portion of said support member, and each include a transfer member for moving said support member, an urging member for urging said transfer member in a transfer direction;

said coincidence control device is a connection member for moving said transfer members simultaneously;

wherein said transfer members are disposed in circular fashion and said connection member is a ring-shaped plate fixed to the transfer members;

wherein a portion of said ring-shaped plate is cut out, and has a plurality of support portions extending in a direction of a circumference about a central axis of said pressure plate; and said urging member is supported by said support mechanism, and is a spring for urging said transfer members in the transfer direction.

9. A clutch cover assembly according to claim 8, wherein said ring-shaped plate is formed of a multiple of divided pieces.

10. A clutch cover assembly, coupled to an output rotation member, for engaging and disengaging a friction member to and from an input rotation member, comprising:

a dish shaped clutch cover fixed externally about the input rotation member;

a disc shaped pressure plate disposed within said clutch cover, having a pressing surface in contact with one side of a friction member;

a support mechanism disposed opposite the pressing surface side of said pressure plate being non-rotatable with respect to said pressure plate and movable in an axial direction;

a diaphragm spring urging said pressure plate toward the input rotation member via said support member;

a plurality, of wear compensation mechanisms, disposed at various areas on said pressure plate, move slid support mechanism away from said pressure plate and toward the diaphragm spring in response to the amount of wear on said friction member;

a coincidence control device for simultaneously moving each one of said wear compensation devices;

wherein said compensation devices contact a portion of said support member, and each include a transfer member for moving said support member, an urging member for urging said transfer member in a transfer direction;

said coincidence control device is a connection member for moving said transfer members simultaneously; and wherein said support mechanism has a disc shaped metal plate disposed to cover the outer perimeter of said pressure plate, a plurality of cam members fixed to the pressure plate side of said metal plate, and a disc shaped support member disposed on the diaphragm spring side of said metal plate and has protruding portions in contact with said diaphragm spring.

11. A clutch cover assembly according to claim 10, wherein said transfer members are disposed in circular fashion, and said connection member is a ring-shaped plate fixed to the transfer members.

12. A clutch cover assembly according to claims 10, wherein said disc shaped support member is a plate spring.

\* \* \* \* \*